No. 808,168.
PATENTED DEC. 26, 1905.
J. W. REED.
SPADE OR SHOVEL.
APPLICATION FILED AUG. 17, 1905.
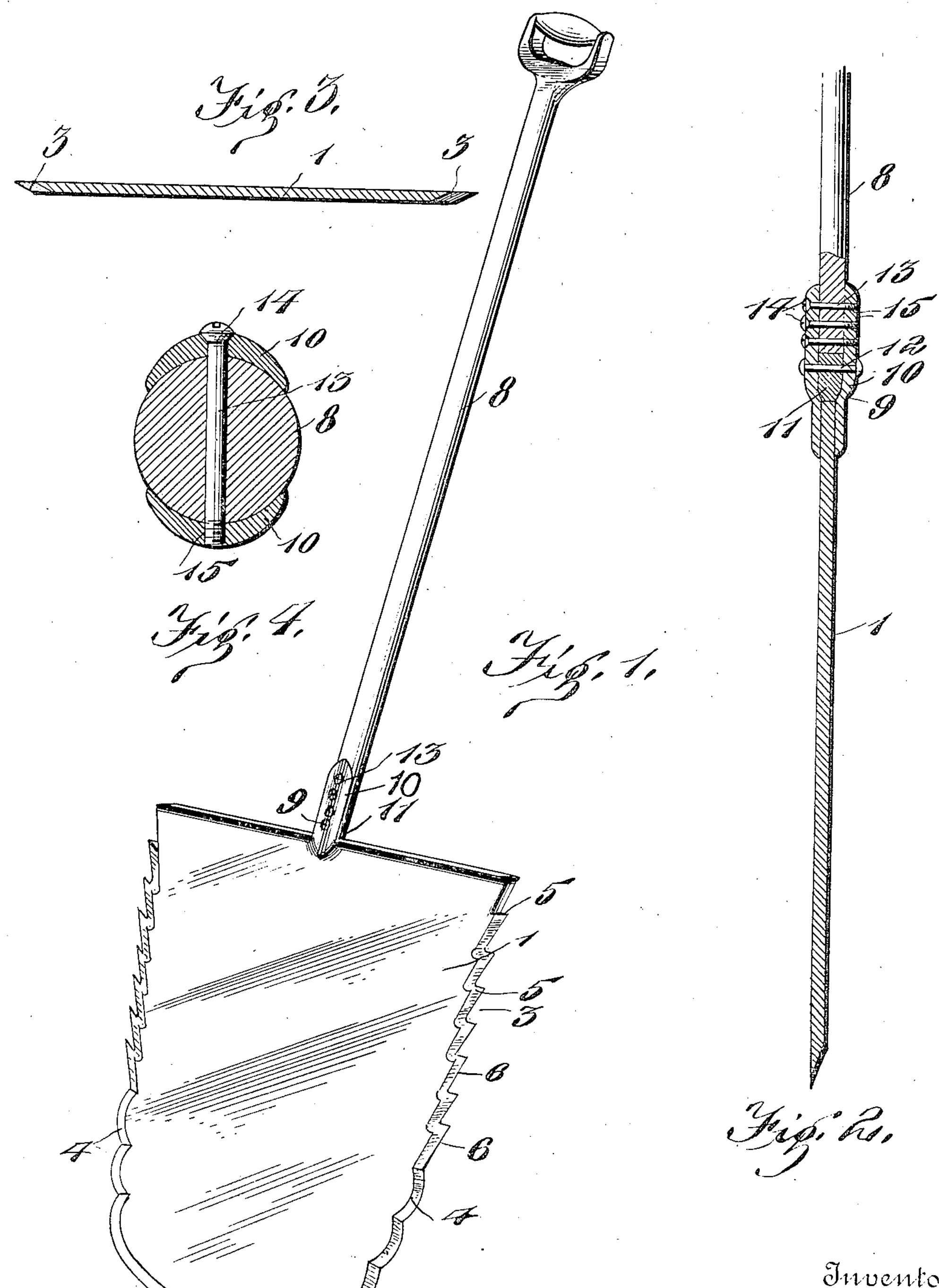
Witnesses
Forrest L. Smith.
C. H. Griesbauer.
Inventor
J. W. Reed
by H. B. Willson
Attorney

UNITED STATES PATENT OFFICE.

JESSE W. REED, OF DETROIT, MICHIGAN.

SPADE OR SHOVEL.

No. 808,168. Specification of Letters Patent. Patented Dec. 26, 1905.

Application filed August 17, 1905. Serial No. 274,592.

*To all whom it may concern:*

Be it known that I, JESSE W. REED, a citizen of the United States, residing at Detroit, in the county of Wayne and State of Michigan, have invented certain new and useful Improvements in Spades or Shovels; and I do declare the following to be a full, clear, and exact description of the invention, such as will enable others skilled in the art to which it appertains to make and use the same.

My invention relates to improvements in spades or shovels; and it consists of certain novel features of construction, combination, and arrangement of parts hereinafter described and claimed.

The object of the invention is to provide a simple, inexpensive, and efficient spade or shovel which may be readily forced into the ground and which will cut or sever the roots of plants, bushes, and small trees.

Another object of the invention is to provide a tool of this character with a removable or interchangeable handle of simple and durable construction.

The above and other objects, which will appear as the nature of my invention is better understood, are accomplished by means of the construction illustrated in the accompanying drawings, in which—

Figure 1 is a perspective view of the rear face of a spade constructed in accordance with my invention. Fig. 2 is a longitudinal sectional view through the same. Fig. 3 is a transverse sectional view through the blade, and Fig. 4 is a transverse sectional view through the handle.

Referring to the drawings by numeral, 1 denotes the blade of a spade, shovel, or similar implement, which is flat and tapered slightly from its upper or inner end to its lower or outer end. The lower end of the blade 1 is curved or rounded, as shown at 2, and its side edges are formed with cutting-teeth 3. The two or three teeth nearest the bottom 2 are curved or rounded, as shown at 4, and the remaining ones angular like the teeth of a saw, the short face 5 of each tooth being disposed substantially horizontally and the long face 6 being inclined outwardly and upwardly. Both the bottom and side edges of the blade are beveled upon their rear faces, so that the edges of the teeth are sharp to permit them to cut or sever the roots of plants, bushes, and the like. By constructing the blade in this manner it may be readily driven into the earth by pressing downwardly with the foot upon the straight upper edge of the same.

The handle 8 of the blade may be of any desired form and secured to the blade in any manner; but I preferably provide upon said blade a clamping device or socket 9, so that the handle may be removed and replaced when broken, or one of a different style may be substituted. This device 9 consists of two substantially semicircular straps 10, which have their lower ends welded, riveted, or otherwise secured upon the opposite faces of the blade 1 at the center of its upper end. These straps 10 form between them a socket to receive the lower end of the handle 8, and they are spaced apart by a block or plug 11, which is riveted between them, as shown at 12. The handle 8 is removably secured between the straps 10 by means of screws 13, which have their heads 14 countersunk in the upper strap. The body portions of said screws extend through openings in the handle 8, and their threaded ends are engaged with threaded openings 15, formed in the lower strap 10, as clearly shown in Fig. 4 of the drawings. This construction permits the handle to be removed when broken or when it is desired to substitute a different form of handle. It will be seen that with slight changes this handle-fastening means may be used upon pitchforks and other implements.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

The herein-described spade having a flat blade tapered downwardly, rounded at its lower edge, provided on its side edges next its lower edge with rounded teeth and having angular teeth on its side edges, each having an upper horizontal short face and an outer inclined long face, the side and bottom edges of the said blade being beveled on their rear side to form cutting edges for the bottom edge of the spade and for the teeth.

In testimony whereof I have hereunto set my hand in presence of two subscribing witnesses.

JESSE W. REED.

Witnesses:
FREDERICK J. B. SERALD,
WILLIAM H. FLYNN.